(12) United States Patent
Sonoda et al.

(10) Patent No.: US 7,174,883 B2
(45) Date of Patent: Feb. 13, 2007

(54) INTAKE-NEGATIVE-PRESSURE-INCREASING APPARATUS FOR ENGINE

(75) Inventors: Yukihiro Sonoda, Sunto-gun (JP); Mamoru Yoshioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/219,705

(22) Filed: Sep. 7, 2005

(65) Prior Publication Data
US 2006/0060175 A1 Mar. 23, 2006

(30) Foreign Application Priority Data
Sep. 22, 2004 (JP) ............................. 2004-275635
Aug. 8, 2005 (JP) ............................. 2005-229298

(51) Int. Cl.
B60T 17/00 (2006.01)
F02D 9/02 (2006.01)

(52) U.S. Cl. ................................... 123/586

(58) Field of Classification Search ........ 123/585–587, 123/339.1, 339.11, 339.14
See application file for complete search history.

(56) References Cited

U.S. PATENT DOCUMENTS 4,870,944 A * 10/1989 Matsumoto et al. ........ 123/585
4,895,125 A * 1/1990 Geiger .................. 123/568.11
5,797,382 A 8/1998 Yoshioka et al.
6,041,754 A * 3/2000 Mori et al. ............. 123/339.23
6,951,199 B2 * 10/2005 Suzuki ................... 123/339.11
2004/0182363 A1 * 9/2004 Suzuki ................... 123/339.11

FOREIGN PATENT DOCUMENTS

| JP | A 10-103082 | 4/1998 | |
| JP | A 11-342840 | 12/1999 | |
| JP | B2 3465484 | 8/2003 | |
| JP | 2005005201196 A * | 7/2005 | ................. 123/585 |

* cited by examiner

*Primary Examiner*—Marguerite McMahon
(74) *Attorney, Agent, or Firm*—Oliff & Berridge, PLC

(57) ABSTRACT

An intake-negative-pressure-increasing apparatus is disclosed, for use with an engine, and comprises a bypass passage extending from an intake pipe portion in the neighborhood of the throttle valve to an intake pipe portion downstream of the intake pipe portion in the neighborhood of the throttle valve. A negative pressure is generated by the air flowing through the bypass passage and is supplied to an actuator operated by the negative pressure as the driving power. At least one air inlet opening of the bypass passage open to the intake pipe portion in the neighborhood of the throttle valve is formed in the intake pipe in such a manner that as long as the opening degree of the throttle valve is within a specified range, a part of the air inlet opening is closed by the outer peripheral end surface of the throttle valve, and the area of the part of the air inlet opening not closed by the outer peripheral end surface of the throttle valve and kept open upstream of the throttle valve can be changed by adjusting the opening degree of the throttle valve.

8 Claims, 4 Drawing Sheets

INTAKE-NEGATIVE-PRESSURE-INCREASING APPARATUS FOR ENGINE

BACKGROUND OF THE INVENTION

1. Field of the Invention

This invention relates to an intake-negative-pressure-increasing apparatus for an engine.

2. Description of the Related Art

Japanese Unexamined Patent Publication No. 11-342840 discloses an engine comprising a bypass passage bypassing a throttle valve and an idle speed control valve (hereinafter referred to as the ISC valve) arranged in the bypass passage. The flow rate of the air flowing in the bypass passage can be controlled by controlling the opening degree of the ISC valve. In the engine described in Japanese Unexamined Patent Publication No. 11-342840, in the case where an idling operation is required, the throttle valve is closed while at the same time the ISC valve is opened, and further, by controlling the opening degree of the ISC valve, the intake air amount (the amount of the air introduced into the combustion chamber) is controlled thereby to control the engine speed during an idling operation.

Also, in the engine described in Japanese Unexamined Patent Publication No. 11-342840, a negative pressure is generated by the air flowing through the bypass passage and introduced into a brake booster. Thus, a negative pressure corresponding to the flow rate of the air passing through the bypass passage is generated. In other words, by controlling the opening degree of the ISC valve, the intake air amount and the magnitude of the negative pressure generated by the air flowing through the bypass passage are controlled.

SUMMARY OF THE INVENTION

As described above, in the engine described in Japanese Unexamined Patent Publication No. 11-342840, the ISC valve is used to control the flow rate of the air flowing through the bypass passage. If the intake air amount and the magnitude of the negative pressure generated by the air flowing through the bypass passage could be controlled without using the ISC valve, however, the cost could be reduced.

Accordingly, it is an object of the invention to provide an intake-negative-pressure-increasing apparatus for the engine in which the intake air amount and the magnitude of the negative pressure generated by the air flowing through the bypass passage can be controlled without using the ISC valve.

In order to achieve this object, according to a first aspect of the invention, there is provided an intake-negative-pressure-increasing apparatus for an engine comprising a bypass passage extending from an intake pipe portion in the neighborhood of the throttle valve to an intake pipe portion downstream of the intake pipe portion in the neighborhood of the throttle valve, wherein a negative pressure is generated by the air flowing through the bypass passage and is supplied to an actuator operated by the negative pressure, as the driving power, and wherein at least one air inlet opening of the bypass passage open to the intake pipe portion in the neighborhood of the-throttle valve is formed in the intake pipe in such a manner that as long as the opening degree of the throttle valve is within a specified range, a part of the air inlet opening is closed by the outer peripheral end surface of the throttle valve, and the area of the part of the air inlet opening not closed by the outer peripheral end surface of the throttle valve and kept open upstream of the throttle valve can be changed by adjusting the opening degree of the throttle valve.

According to a second aspect of the invention, in the first aspect of the invention, there is provided an intake-negative-pressure-increasing apparatus, wherein the bypass passage includes a restricted portion, a negative pressure is generated by the air passing through the restricted portion, and a path of the cooling water for cooling the engine is formed in the neighborhood of the restricted portion.

According to a third aspect of the invention, in the first aspect of the invention, there is provided an intake-negative-pressure-increasing apparatus, wherein the area of the part of the air inlet opening not closed by the outer peripheral end surface of the throttle valve and open upstream of the throttle valve during the warm-up idling operation is smaller than the area of the part of the air inlet opening not closed by the outer peripheral end surface of the throttle valve and open upstream of the throttle valve during the cold idling operation.

According to a fourth aspect of the invention, in the third aspect of the invention, there is provided an intake-negative-pressure-increasing apparatus, wherein the air inlet opening is formed in the intake pipe in such a manner that the area of the part of the air inlet opening not closed by the outer peripheral end surface of the throttle valve and open upstream of the throttle valve is substantially zero when the throttle valve is closed completely during-the warm-up idling operation and that the area of the part of the air inlet opening not closed by the outer peripheral end surface of the throttle valve and open upstream of the throttle valve is a maximum when the throttle valve is set to a predetermined opening degree during the cold idling operation.

According to a fifth aspect of the invention, in the first aspect of the invention, there is provided an intake-negative-pressure-increasing apparatus, wherein the air inlet opening is formed in the intake pipe in such a manner that the area of the part of the air inlet opening not closed by the outer peripheral end surface of the throttle valve and open upstream of the throttle valve is not zero but is smaller than the area of the part of the air inlet opening not closed by the outer peripheral end surface of the throttle valve and open downstream of the throttle valve when the throttle valve is closed completely during the warm-up idling operation and that the area of the part of the air inlet opening not closed by the outer peripheral end surface of the throttle valve and open upstream of the throttle valve is a maximum when the throttle valve is set to a predetermined opening degree during the cold idling operation.

According to a sixth aspect of the invention, in the first aspect of the invention, there is provided an intake-negative-pressure-increasing apparatus, wherein the air inlet opening is formed in the intake pipe in such a manner that the area of the part of the air inlet opening not closed by the outer peripheral end surface of the throttle valve and open upstream of the throttle valve is zero and the area of the part of the air inlet opening not closed by the outer peripheral end surface of the throttle valve and open downstream of the throttle valve is a maximum when the throttle valve is closed completely during the warm-up idling operation and that the area of the part of the air inlet opening not closed by the outer peripheral end surface of the throttle valve and open upstream of the throttle valve is not zero when the throttle valve is set to a predetermined opening degree during the cold idling operation.

According to a seventh aspect of the invention, in any one of the first to sixth aspects of the invention, there is provided an intake-negative-pressure-increasing apparatus, wherein a negative pressure introduction path for introducing the negative pressure generated by the air flowing through the bypass passage into the actuator includes a check valve for shutting off the negative pressure introduction path to prevent the negative pressure introduced into the actuator from leaking to the bypass passage.

According to an eighth aspect of the invention, in any one of the first to seventh aspects of the invention, there is provided an intake-negative-pressure-increasing apparatus, wherein the actuator is a brake booster.

According to this invention, the flow rate of the air flowing through the bypass passage can be controlled by the throttle valve, and therefore the intake air amount and the magnitude of the negative pressure generated by the air flowing through the bypass passage can be controlled without using the idle speed control valve in addition to the throttle valve.

BRIEF DESCRIPTION OF THE DRAWINGS

The present invention may be more fully understood from the description of the preferred embodiments of the invention set forth below together with the accompanying drawings, in which.

DESCRIPTION OF THE PREFERRED EMBODIMENTS

Figure 1:
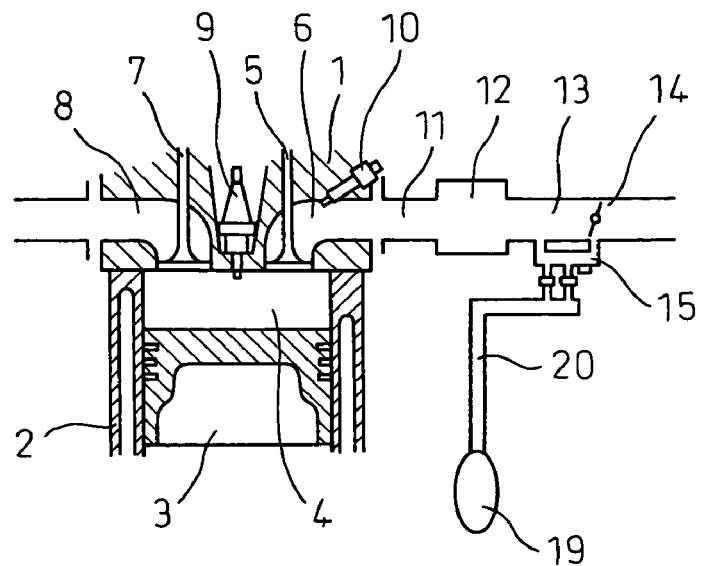
FIG. 1 is a diagram showing an engine according to the invention.

This invention is explained below with reference to the drawings. FIG. 1 shows an engine to which the invention is applicable. In FIG. 1, reference numeral 1 designates a cylinder head, numeral 2 a cylinder block, numeral 3 a piston, numeral 4 a combustion chamber, numeral 5 an intake valve, numeral 6 an intake port, numeral 7 an exhaust valve, numeral 8 an exhaust port, numeral 9 a spark plug, and numeral 10 a fuel injection valve. The fuel injection valve 10 is mounted on the cylinder head 1 in such a manner as to inject fuel into the intake port 6.

The intake port 6 is connected to a surge tank 12 through an intake manifold 11. The upstream portion of the surge tank 12 is connected with an intake pipe 13. The intake pipe 13 has arranged therein a throttle valve 14 for controlling the intake air amount (the amount of the air introduced into the combustion chamber 4). As shown in detail in FIG. 2, a bypass passage 15 for causing the air flowing through the intake pipe 13 to bypass the throttle valve 14 is connected to the intake pipe 13. Specifically, the bypass passage 15 extends from the portion of the intake pipe 13 in the neighborhood of the throttle valve 14 to the downstream portion of the intake pipe 13. A plurality of openings (hereinafter referred to as the air inlet openings) 16 of the bypass passage 15, open to the portion of the intake pipe 13 in the neighborhood of the throttle valve 14, introduce the air into the bypass passage 15, and an opening (hereinafter referred to as the air exhaust opening) 17 of the bypass passage 15 open to the portion of the intake pipe 13 downstream of the air inlet openings 16, returns the air flowing through the bypass passage 15 into the intake pipe 13. The air inlet openings 16 are formed in the intake pipe 13 in such a manner that a part of each air inlet opening 16 is closed by the outer peripheral end surface 14A (FIG. 2) of the throttle valve 14 and at least a part of the remainder of the air inlet opening 16 is open to the upstream side (i.e. the atmospheric side) of the throttle valve 14 without being closed by the outer peripheral end surface 14A of the throttle valve 14 as long as the opening degree of the throttle valve 14 is in a specified range. By adjusting the opening degree of the throttle valve 14 in the specified range described above, the area of the air inlet opening open to the upstream side of the throttle valve 14 can be changed (controlled).

Figure 2:
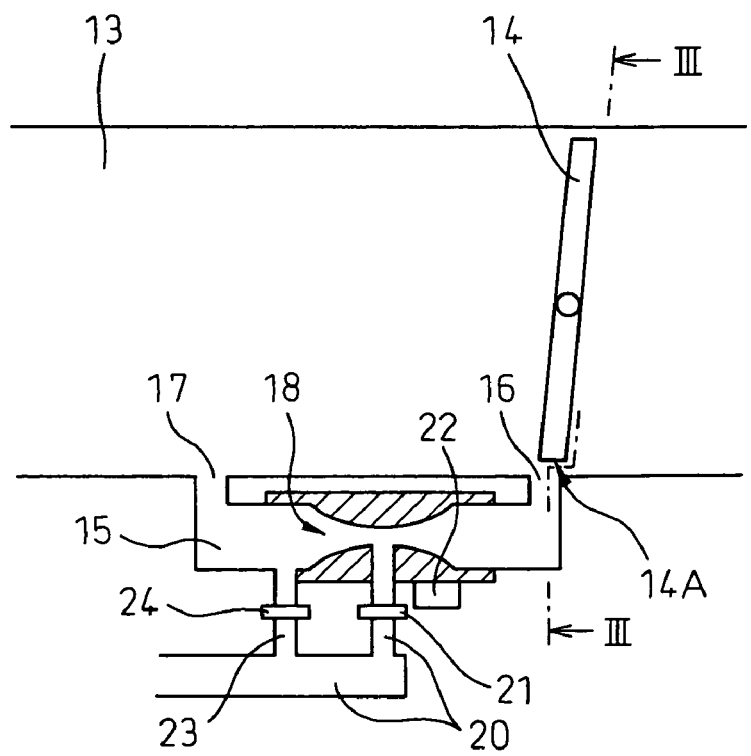
FIG. 2 is a detailed diagram showing the parts surrounding the throttle valve of the engine shown in FIG. 1.

As shown in FIG. 2, a restricted portion (an ejector) 18 is arranged in the bypass passage 15. The velocity of the air introduced by way of the air inlet openings 16 of the bypass passage 15 and flowing through the restricted portion 18 is enhanced by the restriction effect of the restricted portion 18. The restricted portion 18 is also connected to a path 20 connected to a brake booster 19 (FIG. 1). When the air flows through the restricted portion 18, a negative pressure is generated in the path 20 in the neighborhood of the restricted portion 18. The negative pressure generated becomes higher, the higher the flow rate of the air flowing through the restricted portion 18. The path 20 is for introducing the negative pressure generated in the path 20 into the brake booster 19, and also called "the first negative pressure introduction path".

When air flows through the restricted portion 18, the temperature in the neighborhood of the restricted portion 18 drops with the occasional result that the neighborhood of the restricted portion 18 is frozen. To prevent the restricted portion 18 from being frozen, according to this embodiment, a path (hereinafter referred to as the cooling water path) 22 for supplying the cooling water to cool the engine is formed in the neighborhood of the restricted portion 18. The cooling water is for cooling the engine, and therefore kept lower in temperature than the neighborhood of the combustion chamber, though higher than the temperature (i.e. 0° C.) at which the restricted portion 18 is frozen. By arranging the cooling water path 22 in the neighborhood of the restricted portion 18, therefore, the neighborhood of the restricted portion 18 is prevented from being frozen.

The arrangement of a cooling water path in the neighborhood of the throttle valve 14 is, of course, common practice. Without the cooling water path 22 in the neighborhood of the restricted portion 18, therefore, the restricted portion 18, simply by being arranged in the neighborhood of the throttle valve 14, can be prevented from being frozen.

The first negative pressure introduction path 20 has arranged therein a check valve (a one-way valve hereinafter referred to as the first check valve) 21 adapted to open only in such a direction as to introduce the negative pressure from the restricted portion 18 toward the brake booster 19, i.e. only in such a direction that the air flows from the brake booster 19 toward the restricted portion 18. In the case where the air flows through the restricted portion 18 and a negative pressure is generated in the first negative pressure introduction path 20 in the neighborhood of the restricted portion 18, therefore, the first check valve 21 opens and the air is sucked into the restricted portion 18 from the brake booster 19 through the first negative pressure introduction path 20. In this way, the negative pressure generated in the first negative pressure introduction path 20 is led into the brake booster 19 through the first negative pressure introduction path 20.

In the case where the throttle valve 14 is closed completely (or reduced to a very small opening degree), a negative pressure is generated in the intake pipe 13 downstream of the throttle valve 14. A path (hereinafter also referred to as a second negative pressure introduction path) 23 extending from the bypass passage 15 downstream of the restricted portion 18 to the brake booster 19 through the first negative pressure introduction path 20 is formed to introduce the negative pressure generated in the intake pipe 13 downstream of the throttle valve 14 into the brake booster 19. Specifically, the second negative pressure introduction path 23 extends from the bypass passage 15 to the first negative pressure introduction path 20 nearer to the brake booster 19 than to the first check valve 21.

The negative pressure introduced through the second negative pressure introduction path 23 and the first negative pressure introduction path 20 to the brake booster 19 is introduced from the intake pipe 13 to the bypass passage 15 through the air exhaust opening 17 of the bypass passage 15. This second negative pressure introduction path 23 also has arranged therein a check valve (a one-way valve similar to the first check valve 21, hereinafter referred to as a second check valve) 24 adapted to open only in such a direction as to introduce the negative pressure from the bypass passage 15 toward the brake booster 19, i.e. only in such a direction as to allow the air to flow from the brake booster 19 toward the restricted portion 18. Upon generation of the negative pressure in the intake pipe 13 downstream of the throttle valve 14, therefore, the second check valve 24 opens, and the air is sucked into the bypass passage 15 from the brake booster 19 through the first negative pressure introduction path 20 and the second negative pressure introduction path 23, with the result that the air is finally discharged into the intake pipe 13 downstream of the throttle valve 14 from the air exhaust opening 17 of the bypass passage 15. In other words, the negative pressure generated in the intake pipe 13 downstream of the throttle valve 14 is introduced into the brake booster 19 through the bypass passage 15 downstream of the restricted portion 18, the second negative pressure introduction path 23 and the first negative pressure introduction path 20.

Figure 3:
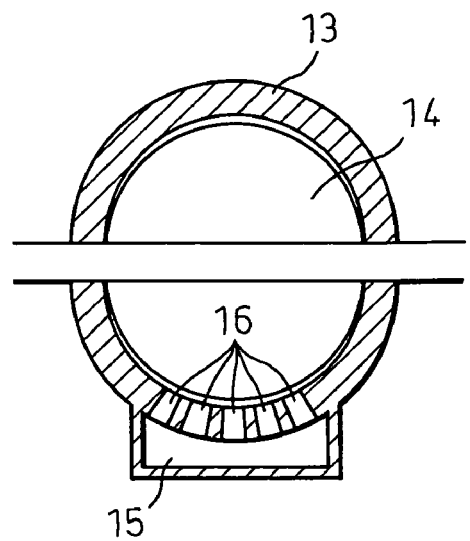
FIG. 3 is a sectional view taken in line III—III in FIG. 2.

As shown in FIG. 3, according to this embodiment, five air inlet openings 16 are formed in the bypass passage 15.

During the cold idling operation (i.e. during the idling operation with the engine at a low temperature such as immediately after the restart of the engine after a protracted suspension of engine operation, i.e. during what is called the idling operation immediately after cold start), the temperature of the engine (hereinafter referred to as the engine temperature) is so low that the friction is large between the cylinder bore wall surface of the combustion chamber 4 and the wall surface of the piston 3. Even during the idling operation, therefore, the intake air amount is required to be increased comparatively and so is the fuel injection amount (the amount of the fuel injected from the fuel injection valve).

Figure 4A:
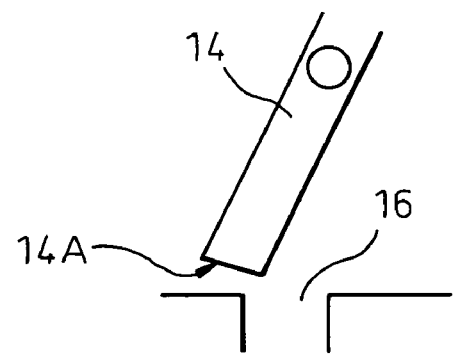
FIG. 4A shows the operation of the parts surrounding the throttle valve during the idling operation immediately after cold start according to a first embodiment.

In view of this, according to this embodiment, as shown in FIG. 4A, the thickness of the throttle valve 14, the opening area of the air inlet openings 16 and the relative positions of the throttle valve 14 and the air inlet openings 16 are set in such a manner that the area of the part of the air inlet openings 16 open to the upstream side (i.e. the atmosphere side) of the throttle valve 14 without being closed by the outer peripheral end surface 14A of the throttle valve 14 (hereinafter referred to as the atmosphere-side open area of the air inlet openings) assumes a maximum value when the throttle valve is set to a predetermined opening degree (the opening degree of the throttle valve 14) during the cold idling operation. As a result, a comparatively large amount of air is sucked into the combustion chamber through the bypass passage 15, and therefore the intake air amount is comparatively large. By increasing the fuel injection amount correspondingly, therefore, even a cold idling operation can be performed satisfactorily. In the process, the flow rate of the air flowing in the bypass passage 15 is so high that a high negative pressure is generated in the first negative pressure introduction path 20 in the neighborhood of the restricted portion 18. Thus, the negative pressure can be accumulated quickly in the brake booster during the cold idling operation such as immediately after the engine start.

During the idling operation after the engine temperature increases to a comparatively high level (hereinafter referred to as the warm-up idling operation), on the other-hand, the friction between the cylinder bore wall surface of the combustion chamber 4 and the wall surface of the piston 3 is decreased and therefore the required intake air amount is not so large. To improve the fuel consumption, therefore, the intake air amount is preferably reduced.

Figure 4B:
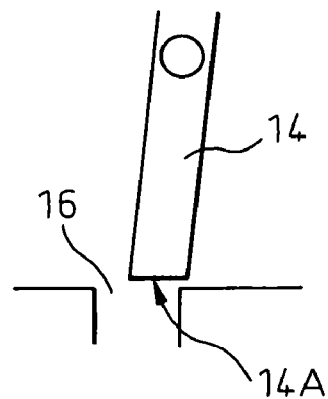
FIG. 4B shows the operation of the parts surrounding the throttle valve during the idling operation after the warm-up mode according to the first embodiment.

In view of this, according to this embodiment, the thickness of the throttle valve 14, the opening area of the air inlet openings 16 and the relative positions of the throttle valve 14 and the air inlet openings 16 are set in such a manner that the area of the atmosphere-side opening of the air inlet openings 16 is zero when the throttle valve 14 is closed completely during the warm-up idling operation, as shown in FIG. 4B. As a result, only the air passed through the gap between the outer peripheral end surface 14A of the throttle valve 14 and the inner wall surface of the intake pipe 13 is sucked into the combustion chamber, and therefore the intake air amount is comparatively small. Thus, by reducing the fuel injection amount correspondingly, the fuel consumption rate is improved. Also, the engine speed can be greatly reduced during the warm-up idling operation.

As described above, according to this embodiment, the area of the atmosphere-side opening of the air inlet openings 16 can be changed by changing the throttle opening degree at about zero (with the approach of the throttle opening degree to zero, the ratio of the amount of the air sucked into the combustion chamber 4 through the bypass passage 15 to the amount of the air sucked into the combustion chamber 4 not through the bypass passage 15, is increased). In other words, according to this embodiment, the area of the atmosphere-side opening of the air inlet openings 16 can be changed (controlled) by the outer peripheral end surface 14A of the throttle valve 14.

With the change in the area of the atmosphere-side opening of the air inlet openings 16, the intake air amount changes and so does the magnitude of the negative pressure generated in the first negative pressure introduction path 20 in the neighborhood of the restricted portion 18 of the bypass passage 15. Specifically, according to this embodiment, the area of the atmosphere-side opening of the air inlet openings 16 is controlled by the outer peripheral end surface 14A of the throttle valve 14. Therefore, the intake air amount and the flow rate of the air flowing into the restricted portion 18 can be controlled without anything other than throttle valves which include the idle speed control valve for controlling the intake air amount during the idling operation and the flow rate control valve for controlling the flow rate of the air flowing into the restricted portion 18.

Figure 5A:
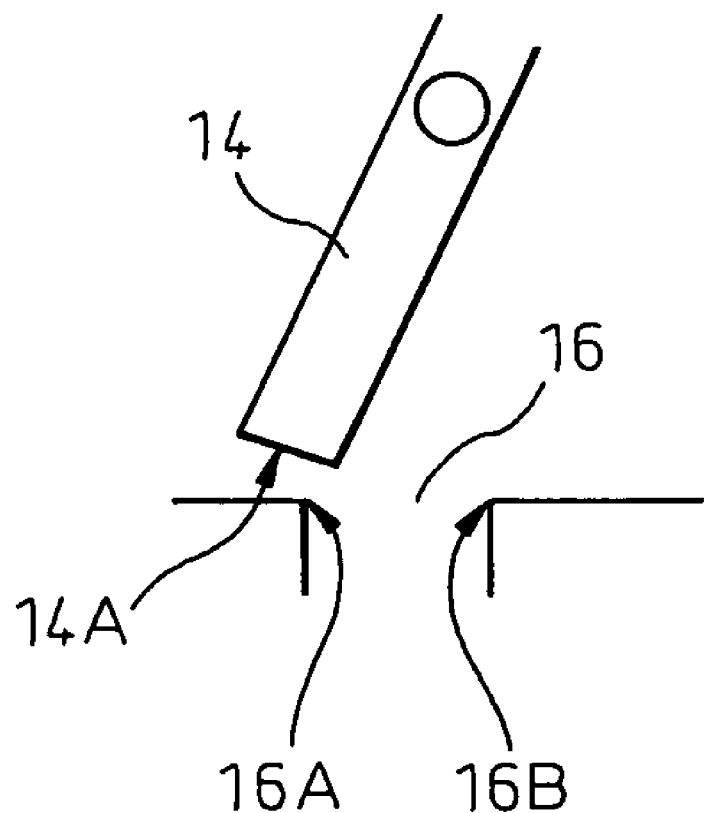
FIG. 5A shows the operation of the parts surrounding the throttle valve during the idling operation immediately after the cold start according to a second embodiment.
Figure 5B:
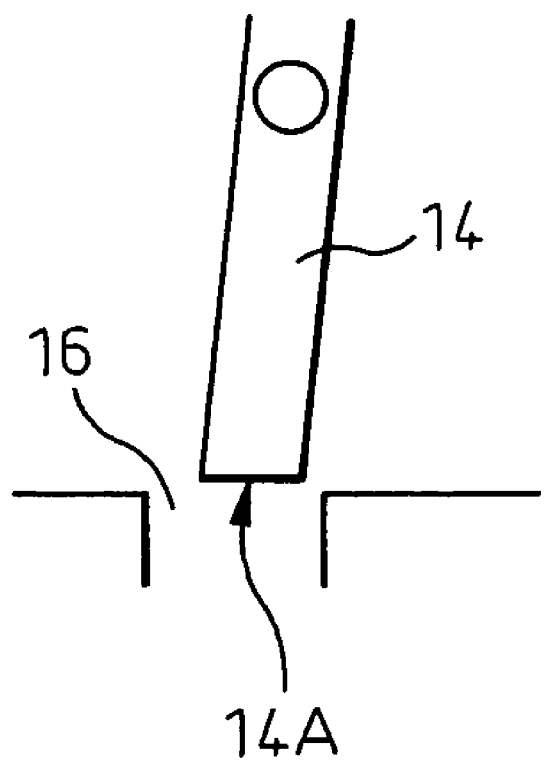
FIG. 5B shows the operation of the parts surrounding the throttle valve during the idling operation after the warm-up mode according to the second embodiment.

Also, the thickness of the throttle valve 14, the opening area of the air inlet openings 16 and the relative positions of the throttle valve 14 and the air inlet openings 16 may be set as shown in FIGS. 5A and 5B. Specifically, according to the second embodiment shown in FIGS. 5A and 5B, the thickness of the throttle valve 14, the opening area of the air inlet openings 16 and the relative positions of the throttle valve 14 and the air inlet openings 16 are set in such a manner as to maximize the area of the atmosphere-side opening of the air inlet openings 16, as shown in FIG. 5A, at the predetermined throttle opening degree during the cold idling operation.

According to the second embodiment, on the other hand, the thickness of the throttle valve 14, the opening area of the air inlet openings 16 and the relative positions of the throttle valve 14 and the air inlet openings 16 are set in such a manner that when the throttle valve 14 is closed completely during the warm-up idling operation, as shown in FIG. 5B, the atmosphere-side opening area of the air inlet openings 16 is not zero but is smaller than the area (hereinafter referred to as the combustion chamber-side opening area) of the part of the air inlet openings 16 open to the downstream side (i.e. the combustion chamber 4 side) of the throttle valve 14 without being closed by the outer peripheral end surface 14A of the throttle valve 14.

This second embodiment produces an effect similar to that of the first embodiment. The opening area of the air inlet openings 16 according to the second embodiment is somewhat larger than in the first embodiment. According to the second embodiment, the thickness of the throttle valve 14 is the same as in the first embodiment, and the throttle valve 14 and the edge (indicated by numeral 16A in FIG. 5A) of the air inlet openings 16 nearer to the combustion chamber 4 are maintained in the same relation as in the first embodiment. At the same time, the opening area of the air inlet openings 16 is increased, thereby setting the atmosphere-side edge (16B in FIG. 5A) of the air inlet openings 16 in a position nearer to the atmosphere.

Figure 6A:
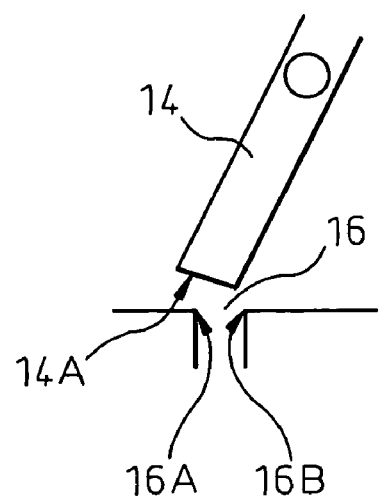
FIG. 6A shows the operation of the parts surrounding the throttle valve during the idling operation immediately after the cold start according to a third embodiment.
Figure 6B:
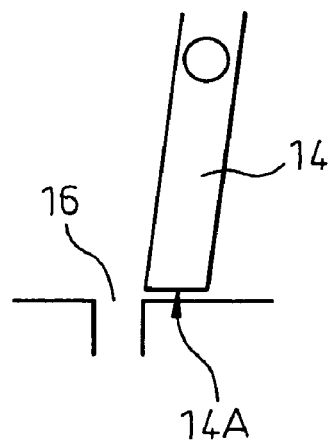
FIG. 6B shows the operation of the parts surrounding the throttle valve during the idling operation after the warm-up mode according to the third embodiment.

Also, the thickness of the throttle valve 14, the opening area of the air inlet openings 16 and the relative positions of the throttle valve 14 and the air inlet openings 16 may be set in the same relation as shown in FIGS. 6A and 6B. Specifically, according to the third embodiment shown in FIGS. 6A and 6B, the thickness of the throttle valve 14, the opening area of the air inlet openings 16 and the relative positions of the throttle valve 14 and the air inlet openings 16 are set in such a manner that the area of the atmosphere-side opening of the air inlet openings 16 assumes a very small value other than zero as shown in FIG. 6A when the throttle opening has the aforementioned predetermined value during the cold idling operation.

According to the third embodiment, on the other hand, the thickness of the throttle valve 14, the opening area of the air inlet openings 16 and the relative positions of the throttle valve 14 and the air inlet openings 16 are set in such a manner that the area of the atmosphere-side opening of the air inlet openings 16 is zero and the area of the combustion chamber-side opening of the air inlet openings 16 is a maximum, as shown in FIG. 6B, when the throttle valve 14 is closed completely during the warm-up idling operation.

The third embodiment produces an effect similar to that of the first embodiment. The opening area of the air inlet openings 16 according to the third embodiment is somewhat smaller than in the first and second embodiments. According to the third embodiment, the thickness of the throttle valve 14 is the same as in the first embodiment. Also, the throttle valve 14 and the edge (16A in FIG. 6A) of the air inlet openings 16 nearer to the combustion chamber 4 are maintained in the same relation as in the first embodiment, while at the same time reducing the opening area of the air inlet openings 16. In this way, the atmosphere-side edge (16B in FIG. 6A) of the air inlet openings 16 is located nearer to the combustion chamber 4.

To summarize the first to third embodiments, the atmosphere-side opening area of the air inlet openings 16 is set smaller during the warm-up idling operation than during the cold idling operation.

Figure 7:
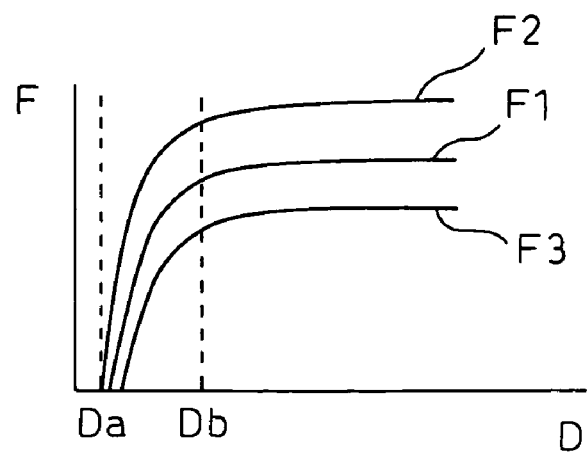
FIG. 7 is a diagram showing the relation between the throttle opening degree D and the flow rate F of the air flowing through the bypass passage.

In each of the first to third embodiments, the relation between the throttle opening degree and the flow rate (hereinafter referred to as the bypass flow rate) of the air flowing in the bypass passage 15 (restricted portion 18) is shown in FIG. 7. In FIG. 7, reference character D designates the throttle opening degree, Da zero, Db the predetermined opening degree, F the bypass flow rate, F1 the relation between the throttle opening degree D and the bypass flow rate F in the first embodiment, F2 the relation between the throttle opening degree D and the bypass flow rate F in the second embodiment, and F3 the relation between the throttle opening degree D and the bypass flow rate F in the third embodiment.

Once the throttle opening degree D is increased from Da of zero to a predetermined opening degree Db, the bypass flow rate F of each embodiment sharply increases from almost zero and, after exceeding the predetermined opening degree Db, assumes substantially the constant value. The rate at which the bypass flow rate F increases with the increase of the throttle opening degree D from Da of zero to the predetermined opening degree Db, however, is largest in the second embodiment, smaller in the first embodiment, and smallest in the third embodiment. Similarly, the bypass flow rate F after the throttle opening degree D exceeds the predetermined opening degree Db is largest in the second embodiment, smaller in the first embodiment and smallest in the third embodiment.

One of the configurations of the first to third embodiments to be employed is determined from the relation between the throttle opening degree D and the bypass flow rate F shown in FIG. 7. As an alternative, the thickness of the throttle valve 14, the opening area of the air inlet openings 16 and the relative positions of the throttle valve 14 and the air inlet openings 16 can be determined in such a manner that a desired relation is secured between the throttle opening degree D and the bypass flow rate F, by taking into consideration the fact that the relation between the throttle opening degree D and the bypass flow rate F changes in accordance with the thickness of the throttle valve 14, the opening area of the air inlet openings 16 and the relative positions of the throttle valve 14 and the air inlet openings 16.

The embodiments described above are applications of this invention, in which the negative pressure generated in the first negative pressure introduction path 20 in the neighborhood of the restricted portion 18 is introduced to the brake booster 19 and used for assisting in the brake operation. This invention, however, can find wider applications in which the negative pressure is supplied to an actuator using the negative pressure as a driving force and used to operate the actuator or assist in the operation of the actuator.

While the invention has been described by reference to specific embodiments chosen for purposes of illustration, it should be apparent that numerous modifications could be made thereto by those skilled in the art without departing from the basic concept and scope of the invention.

The invention claimed is:

1. An intake-negative-pressure-increasing apparatus for an engine comprising a bypass passage extending from an intake pipe portion in the neighborhood of the throttle valve to an intake pipe portion downstream of the intake pipe portion in the neighborhood of the throttle valve, wherein a negative pressure is generated by the air flowing through the bypass passage and is supplied to an actuator operated with the negative pressure as the driving power, and wherein at least one air inlet opening of the bypass passage open to the intake pipe portion in the neighborhood of the throttle valve is formed in the intake pipe in such a manner that as long as the opening degree of the throttle valve is within a specified range, a part of the air inlet opening is closed by the outer peripheral end surface of the throttle valve, and the area of the part of the air inlet opening not closed by the outer peripheral end surface of the throttle valve and kept open upstream of the throttle valve can be changed by adjusting the opening degree of the throttle valve.

2. An intake-negative-pressure-increasing apparatus according to claim 1, wherein the bypass passage includes a restricted portion, a negative pressure is generated by the air passing through the restricted portion, and a path of the cooling water for cooling the engine is formed in the neighborhood of the restricted portion.

3. An intake-negative-pressure-increasing apparatus according to claim 1, wherein the area of the part of the air inlet opening not closed by the outer peripheral end surface of the throttle valve and open upstream of the throttle valve during the warm-up idling operation is smaller than the area of the part of the air inlet opening not closed by the outer peripheral end surface of the throttle valve and open upstream of the throttle valve during the cold idling operation.

4. An intake-negative-pressure-increasing apparatus according to claim 3, wherein the air inlet opening is formed in the intake pipe in such a manner that the area of the part of the air inlet opening not closed by the outer peripheral end surface of the throttle valve and open upstream of the throttle valve is substantially zero when the throttle valve is closed completely during the warm-up idling operation and that the area of the part of the air inlet opening not closed by the outer peripheral end surface of the throttle valve and open upstream of the throttle valve is a maximum when the throttle valve is set to a predetermined opening degree during the cold idling operation.

5. An intake-negative-pressure-increasing apparatus according to claim 1, wherein the air inlet opening is formed in the intake pipe in such a manner that the area of the part of the air inlet opening not closed by the outer peripheral end surface of the throttle valve and open upstream of the throttle valve is not zero but is smaller than the area of the part of the air inlet opening not closed by the outer peripheral end surface of the throttle valve and open downstream of the throttle valve when the throttle valve is closed completely during the warm-up idling operation and that the area of the part of the air inlet opening not closed by the outer peripheral end surface of the throttle valve and open upstream of the throttle valve is a maximum when the throttle valve is set to a predetermined opening degree during the cold idling operation.

6. An intake-negative-pressure-increasing apparatus according to claim 1, wherein the air inlet opening is formed in the intake pipe in such a manner that the area of the part of the air inlet opening not closed by the outer peripheral end surface of the throttle valve and open upstream of the throttle valve is zero and the area of the part of the air inlet opening not closed by the outer peripheral end surface of the throttle valve and open downstream of the throttle valve is a maximum when the throttle valve is closed completely during the warm-up idling operation and that the area of the part of the air inlet opening not closed by the outer peripheral end surface of the throttle valve and open upstream of the throttle valve is not zero when the throttle valve is set to a predetermined opening degree during the cold idling operation.

7. An intake-negative-pressure-increasing apparatus according to claim 1, wherein a negative pressure introduction path for introducing the negative pressure generated by the air of the bypass passage into the actuator includes a check valve for shutting off the negative pressure introduction path to prevent the negative pressure introduced into the actuator from leaking to the bypass passage.

8. An intake-negative-pressure-increasing apparatus according to claim 1, wherein the actuator is a brake booster.

* * * * *